（12）United States Patent
Hori

（10）Patent No.: US 10,225,767 B2
（45）Date of Patent: *Mar. 5, 2019

（54）NETWORK NODE AND COMMUNICATION METHOD

（71）Applicant: PANASONIC INTELLECTUAL PROPERTY CORPORATION OF AMERICA, Torrance, CA (US)

（72）Inventor: Takako Hori, Kanagawa (JP)

（73）Assignee: PANASONIC INTELLECTUAL PROPERTY CORPORTION OF AMERICA, Torrance, CA (US)

（*）Notice: Subject to any disclaimer, the term of this patent is extended or adjusted under 35 U.S.C. 154(b) by 0 days.

This patent is subject to a terminal disclaimer.

（21）Appl. No.: 15/870,256

（22）Filed: Jan. 12, 2018

（65）Prior Publication Data

US 2018/0139662 A1   May 17, 2018

Related U.S. Application Data

（63）Continuation of application No. 15/242,968, filed on Aug. 22, 2016, now Pat. No. 9,906,990, which is a
(Continued)

（30）Foreign Application Priority Data

Nov. 30, 2011   (JP) ................. 2011-261617

（51）Int. Cl.
*H04W 36/00*   (2009.01)
*H04W 36/14*   (2009.01)
(Continued)

（52）U.S. Cl.
CPC ....... *H04W 36/0022* (2013.01); *H04L 65/608* (2013.01); *H04W 36/0005* (2013.01); *H04W 36/14* (2013.01); *H04W 88/181* (2013.01)

（58）Field of Classification Search
CPC ........... H04W 36/0022; H04W 65/608; H04W 88/181
(Continued)

（56）References Cited

U.S. PATENT DOCUMENTS 9,456,388 B2 * 9/2016 Hori ................. H04W 36/0022
9,906,990 B2 * 2/2018 Hori ................. H04W 36/0022
(Continued)

FOREIGN PATENT DOCUMENTS

EP   2458837   5/2012
JP   2002-185554   6/2002
(Continued)

OTHER PUBLICATIONS

"3rd Generation Partnership Project; Technical Specification Group Services and System Aspects; IP Multimedia Subsystem (IMS); Multimedia Telephony; Media handling and interaction (Release 10)", 3GPP TS 26.114 V10.0.0, Mar. 2011, pp. 1-245.
(Continued)

*Primary Examiner* — Nghi H Ly
(74) *Attorney, Agent, or Firm* — Greenblum & Bernstein, P.L.C.

（57）ABSTRACT

A network node is provided that communicates with a first terminal, which supports a first codec and a second terminal. The network node includes a detector that detects switching of a codec of the first terminal and the second terminal, wherein the first codec supports a codec A compatible mode and a codec A non-compatible mode, the first codec being a new codec and codec A having a dedicated payload format, and wherein the codec A compatible mode is compatible with a second codec and the codec A non-compatible mode is non-compatible with the second codec, the second codec being a legacy codec. The network node also includes a transmitter that transmits a signal for the second terminal to
(Continued)

switch the negotiated codec A non-compatible mode of the second terminal to the codec A compatible mode.

12 Claims, 11 Drawing Sheets

Related U.S. Application Data continuation of application No. 14/357,306, filed as application No. PCT/JP2012/007358 on Nov. 16, 2012, now Pat. No. 9,456,388.

(51) Int. Cl.
*H04L 29/06* (2006.01)
*H04W 88/18* (2009.01)

(58) Field of Classification Search
USPC .............. 455/436, 442, 432.1, 422.1, 435.1; 370/331
See application file for complete search history.

(56) References Cited

U.S. PATENT DOCUMENTS

| | | | |
|---|---|---|---|
| 2002/0072364 A1 | 6/2002 | Tamura | |
| 2005/0083910 A1 | 4/2005 | Hallin et al. | |
| 2005/0254440 A1* | 11/2005 | Sorrell | H04L 29/06027 370/264 |
| 2007/0171841 A1* | 7/2007 | Witzel | H04L 29/06027 370/254 |
| 2007/0173239 A1 | 7/2007 | Scott et al. | |
| 2009/0209255 A1 | 8/2009 | Lassers et al. | |
| 2011/0093900 A1* | 4/2011 | Patel | H04N 7/17318 725/54 |
| 2012/0106451 A1 | 5/2012 | Enström et al. | |
| 2012/0140018 A1 | 6/2012 | Pikin | |
| 2013/0102315 A1 | 4/2013 | Koshimizu et al. | |

FOREIGN PATENT DOCUMENTS

| | | |
|---|---|---|
| JP | 2011-514755 | 5/2011 |
| WO | 2011/010530 | 1/2011 |
| WO | 2011-136187 | 11/2011 |

OTHER PUBLICATIONS

G. Zorn et al., "RTP Payload Format for G.718 Speech/Audio", Network Working Group, Nov. 15, 2011, pp. 1-28.

Takashi Koshimizu et al., "Audio Video Call Application of Single Radio Voice Call Continuity", Institute of Electronics, Information, and Communication Engineers, Mar. 2011, B-6-77.

"3rd Generation Partnership Project; Technical Specification Group Services and System Aspects; Single Radio Voice Call Continuity (SRVCC); Stage 2 (Release 9)", 3GPP TS 23.216 V9.6.0, Dec. 2010, pp. 1-42.

J. Sjoberg et al., "RTP Payload Format and File Storage Format for the Adaptive Multi-Rate (AMR) and Adaptive Multi-Rate Wideband (AMR-WB) Audio Codecs", IETF RFC 4867, Apr. 2007, pp. 1-60.

"3rd Generation Partnership Project; Technical Specification Group Services and System Aspects; IP Multimedia Subsystem (IMS) Service Continuity; Stage 2 (Release 11)". 3GPP TS 23.237 V11.0.0, Mar. 2011, pp. 1-155.

"3rd Generation Partnership Project; Technical Specification Group Services and System Aspects; Study of Use Cases and Requirements for Enhanced Voice Codecs for the Evolved Packet System (EPS) (Release 10)", 3GPP TR 22.813 V10.0.0, Mar. 2010, pp. 1-15.

"3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)", 3GPP TR 23.885 V11.0.0, Sep. 2011, pp. 1-83.

International Search Report, dated Feb. 19, 2013, for corresponding International Application No. PCT/JP2012/007358.

Extended European Search Report, dated Jun. 29, 2015, by the European Patent Office for the corresponding European Patent Application.

* cited by examiner

| SDP offer |
|---|
| m=audio 49152 RTP/AVP 97 98<br>a=tcap:1 RTP/AVP<br>a=pcfg:1 t=1<br>a=rtpmap:97 CODEC A/......<br>a=fmtp:97 ......; RTP PAYLOAD FORMAT (DEDICATED TO CODEC A)<br>a=rtpmap:98 CODEC B/......<br>a=fmtp:98 ......<br>...... |
| SDP answer |
| m=audio 49152 RTP/AVPF 98<br>a=tcap:1 RTP/AVP<br>a=acfg:1 t=1<br>a=rtpmap:98 CODEC B/......<br>a=fmtp:98 ......<br>...... |

FIG. 6

| SDP offer |
|---|
| m=audio 49153 RTP/AVP 97<br>a=tcap:1 RTP/AVP<br>a=pcfg:1 t=1<br>a=rtpmap:97 CODEC A/......<br>a=fmtp:97 ......; RTP PAYLOAD FORMAT (CODEC B)<br>....... |
| SDP answer |
| m=audio 49153 RTP/AVP 97<br>a=tcap:1 RTP/AVP<br>a=pcfg:1 t=1<br>a=rtpmap:97 CODEC A/......<br>a=fmtp:97 ......; RTP PAYLOAD FORMAT (CODEC B)<br>....... |

FIG. 10

NETWORK NODE AND COMMUNICATION METHOD

This is a continuation of pending U.S. patent application Ser. No. 15/242,968, filed Aug. 22, 2016, which is a continuation application of U.S. patent application Ser. No. 14/357,306, filed on May 9, 2014, now U.S. Pat. No. 9,456,388 issued Sep. 27, 2016 which is U.S. National Stage of International Application No. PCT/JP2012/007358 filed Nov. 16, 2012 which claims the benefit of Japanese Application No. 2011-261617, filed Nov. 30, 2011, the contents of all of which are expressly incorporated by reference herein in their entireties.

TECHNICAL FIELD

The present invention relates to a network node and a communication method for changing a codec used in a mobile communication system.

BACKGROUND ART

In the related art, voice calls in a mobile communication system of the third generation partnership project (3GPP) are made using a 3GPP circuit switching (CS) network. In recent years, a Voice over Long Term Evolution (VoLTE) service, which provides a voice call using a 3GPP packet switching (PS) network, has been started.

However, the area where the VoLTE service is available is limited for a while. For this reason, when a user moves out of the VoLTE service area during a voice call using on VoLTE (hereinafter, refer to as VoLTE call), it is necessary to switch this call to a call based on a circuit switching technique according to the related art. As a technique that enables this switching, there is single radio voice call continuity (SRVCC) disclosed in Non-Patent Literature (hereinafter, abbreviated as "NPL") 1. Hereinafter, a handover operation based on SRVCC will be described with reference to FIGS. 1 and 2.

FIG. 1 is a diagram illustrating a part of a configuration of a 3GPP mobile communication network. The mobile communication network shown in FIG. 1 is configured using an evolved universal terrestrial radio access network (e-UTRAN), an e-UTRAN base station (e-nodeB), a PS network, a CS network, a base station subsystem of the CS network, and an IP multimedia Subsystem (IMS).

Specifically, in FIG. 1, e-UTRAN is a radio access network that is capable of providing the VoLTE service. The PS network provides the VoLTE service and includes a packet data network gateway (P-GW), a serving gateway (S-GW), and a mobility management entity (MME). The CS network includes a mobile switching center (MSC), and a media gateway (MGW). The base station subsystem of the CS network includes a radio network controller (RNC), and nodeB. IMS performs a call control or the like, and includes a call session control function (CSCF), and a service centralization and continuity application server (SCC AS). Note that in FIG. 1 and FIG. 2, MSC and MGW are represented as a single node (MSC/MGW 110), but may be provided as separate nodes.

In FIG. 1, it is assumed that UE 100 and UE 102 that are mobile communication terminals (user equipment) are initially connected to the PS network, respectively (here, a radio access network, a base station and a PS network on the side of UE 102 are not shown). That is, it is assumed that a VoLTE call is made between UE 100 and UE 102. Here, it is assumed that UE 100 is handed over (HO) to the CS network during the call.

Path A, Path B and Path C indicated by solid lines in FIG. 1 represent paths through which speech data passes. Further, reference numerals 200, 202, 204 and 206 indicated by dashed lines in FIG. 1 represent paths through which signals pass in an SRVCC handover process.

FIG. 2 is a sequence chart illustrating an operation of the SRVCC handover process. UE 100 and UE 102 are initially connected to the PS network (e-UTRAN), respectively, and the speech data between UE 100 and UE 102 is transmitted and received through Path A. If UE 100 is distant from a cover area of the e-UTRAN, a-nodeB detects the fact, and exchanges signaling with RNC/nodeB through MME and MSC/MGW 110 (signaling 200 shown in FIG. 1 and step (hereinafter, referred to as "ST") 200 shown in FIG. 2). In ST200, a data path in the CS network is prepared between nodeB and MSC/MGW 110. If the preparation is finished, a command for handover to UTRAN (CS network) is given to UE 100 from MME through e-nodeB.

At the same time with the process of ST200, MSC/MGW 110 exchanges signaling with UE 102 through CSCF/SCC AS (signaling 202 shown in FIG. 1 and ST202 shown in FIG. 2). Thus, a command is given for switching a transmission/reception destination of speech data of UE 102 from UE 100 to MSC/MGW 110, and Path B is established.

After handover to UTRAN, UE 100 exchanges signaling with MSC/MGW 110 through RNC/nodeB (signaling 204 shown in FIG. 1 and ST204 shown in FIG. 2). Thus, Path C is established.

After establishment of Path C, MSC/MGW 110 exchanges signaling with P-GW/S-GW through MME (signaling 206 shown in FIG. 1 and ST206 shown in FIG. 2). Thus, Path A is deleted.

Hereinbefore, the operation of SRVCC handover has been described.

Further, as a technique that improves SRVCC to reduce the time necessary for switching data paths, there is an SRVCC method (eSRVCC: enhanced-SRVCC) that uses access transfer control function (ATCF) enhancement, as disclosed in NPL 3. An example of an operation of eSRVCC will be described with reference to FIGS. 3 and 4.

FIG. 3 shows a part of a configuration of a 3GPP mobile communication network that enables eSRVCC. The mobile communication network shown in FIG. 3 includes e-UTRAN, e-nodeB, a PS network, a CS network, a base station subsystem of the CS network, and IMS, similarly to FIG. 1. Here, an access transfer control function (ATCF) and an access transfer gateway (ATGW), in addition to CSCF and SCC AS, are present in IMS. In FIGS. 3 and 4, ATCF and ATGW are represented as a single node (ATCF/ATGW 320), but may be provided as separate nodes.

In FIG. 3, UE 100 and UE 102 are initially connected to the PS network, respectively (here, a wireless access network, a base station and the PS network on the side of UE 102 are not shown). That is, it is assumed that a VoLTE call is performed between UE 100 and UE 102. Here, it is assumed that UE 100 is handed over to the CS network during a call.

Path A, Path B, Path C and Path D indicated by solid lines in FIG. 3 represent paths through which speech data passes. Further, reference numerals 300, 302, 304 and 306 indicated by dashed lines in FIG. 3 represent paths through which signals in an eSRVCC handover process pass.

FIG. 4 is a sequence chart illustrating an operation of eSRVCC handover. UE 100 and UE 102 are each connected to the PS network (e-UTRAN), initially. In a system in which the eSRVCC handover is realized, in ATCF/ATGW 320, ATCF anchors signaling of IMS (IMS signaling), and ATGW anchors the speech data. That is, when a call between UE 100 and UE 102 starts, the IMS signaling for the call start is relayed by ATCF, and in a case where ATCF determines that anchoring of the speech data in ATGW is necessary, ATGW is allocated as an anchor point of the speech data. Thus, the speech data between UE 100 and UE 102 is transmitted and received through Path A and Path B.

If UE 100 is distant from a cover area of e-UTRAN, e-nodeB detects the fact, and exchanges signaling with RNC/nodeB through MME and MSC/MGW 110 (signaling 300 shown in FIG. 3 and ST300 shown in FIG. 4). In ST300, a data path in the CS network is prepared between nodeB and MSC/MGW 110. If the preparation is finished, a command for handover to UTRAN (CS network) is given to UE 100 from MME through e-nodeB.

Simultaneously with the process of ST300, MSC/MGW 110 transmits signaling to ATCF. Thus, a command for path switching is given to ATGW from ATCF, and a transmission/reception destination of speech data of ATGW is switched from UE 100 to MSC/MGW 100 (signaling 302 shown in FIG. 3 and ST302 shown in FIG. 4). That is, Path C is established. Further, if the path switching process to ATGW is finished, ATCF transmits indication signaling to SCC-AS (signaling 302 shown in FIG. 3 and ST302 shown in FIG. 4).

After handover to UTRAN, UE 100 exchanges signaling with MSC/MGW 110 through RNC/nodeB (signaling 304 shown in FIG. 3 and ST304 shown in FIG. 4). Thus, Path D is established.

After establishment of Path D, MSC/MGW 110 exchanges signaling with P-GW/S-GW through MME (signaling 306 shown in FIG. 3 and ST306 shown in FIG. 4). Thus, Path B is deleted.

Hereinbefore, the operation of eSRVCC handover has been described.

As a voice codec used in the CS network, an adaptive multi-rate wideband (AMR-WB) codec that is a wideband (WB) codec is widely used. AMR-WB is usable in a packet exchanging technique, and thus, may also be considered to be used in the PS network (VoLTE).

There is also a codec that supports an AMR-WB compatible mode as another codec other than AMR-WB used in the PS network (VoLTE) like enhanced voice service (EVS) described, for example, in NPL 4. The AMR-WB compatible mode assumes to be used as an AMR-WB codec with a legacy terminal that normally supports an AMR-WB codec. Therefore, when the codec is used in the PS network (VoLTE), an RTP payload format of the AMR-WB codec described in NPL 2 may be used.

In the related art, the narrowband (NB) codec is a codec that performs coding and decoding processing on a digital acoustic signal sampled at 8 kHz. The narrowband codec generally has a frequency band of 300 Hz to 3.4 kHz, but the frequency band is not limited to this, and can be within a range of 0 to 4 kHz. On the other hand, the wideband codec is a codec that performs coding and decoding processing on a digital acoustic signal sampled at 16 kHz. The wideband codec generally has a frequency band of 50 Hz to 7 kHz, but the frequency band is not limited to this and can be within a range of 0 to 8 kHz. A super wideband (SWB) codec is a codec that performs coding and decoding processing on a digital acoustic signal sampled at 32 kHz. The super wideband codec generally has a frequency band of 50 Hz to 14 kHz, but the frequency band is not limited to this and can be within a range of 0 to 16 kHz.

CITATION LIST

Non-Patent Literature

NPL 1
3GPP TS23.216 v9.6.0 "Single Radio Voice Call Continuity (SRVCC)"
NPL 2
IETF RFC 4867, "RTP Payload Format and File Storage Format for the Adaptive Multi-Rate (AMR) and Adaptive Multi-Rate Wideband (AMR-WB) Audio Codecs"
NPL 3
3GPP TS23.237 v11.0.0 "IP Multimedia Subsystem (IMS) Service Continuity"
NPL 4
3GPP TR22.813 v11.0.0 "Study of Use Cases and Requirements for Enhanced Voice Codecs for the Evolved Packet System (EPS)"
NPL 5
Takashi Koshimizu and Katsutoshi Nishida, "Audio Video Call Application of Single Radio Voice Call Continuity", General meeting of the Institute of Electronics, Information and Communication Engineers in 2011, B-6-77
NPL 6
3GPP TS26.114 v10.0.0 "IP Multimedia Subsystem (IMS); Multimedia Telephony, Media handling and interaction"
NPL 7
G Zorn (Ed), "RTP Payload Format for G718 Speech/Audio," Nov. 15, 2011, work in progress
NPL 8
3GPP TR23.885 v11.0.0 "Feasibility Study of Single Radio Voice Call Continuity (SRVCC) from UTRAN/GERAN to E-UTRAN/HSPA"

SUMMARY OF INVENTION

Technical Problem

In FIG. 1 or FIG. 3, when UE 100 is handed over from the PS network to the CS network, in a case where the codec used in the PS network is not supported in the CS network, the codec used by UE 100 is changed to a codec supported by the CS network. In a case where change of the codec occurs in UE 100, in order to enable call continuity between UE 100 and UE 102, the following two methods may be considered. The first method is a method of performing transcoding in the MSC/MGW or ATCF/ATGW. The second method is a method of changing the codec used by UE 102 to the same codec as the changed codec of UE 100.

In the method of performing transcoding, which was mentioned first, call quality deteriorates due to transcoding. On the other hand, in the method of changing the codec, which was mentioned later, although deterioration of call quality which occurs in the method of performing transcoding does not occur, signaling used to change the codec of UE 102 takes time and prolongs the disconnection time of the call, which is not favorable. Further, in the eSRVCC handover, since signaling for path switching in handover of UE 100 is terminated in ATCF, it is difficult to transmit signaling for changing the codec of UE 102. That is, in the eSRVCC handover, it is difficult to change the codec of UE 102 using the existing signaling.

It is an object of the present invention to provide a network node and a communication method that make it possible to continue communication and also to reduce the disconnection time of a call without deteriorating call quality even when a codec used by one of terminals in communication is changed.

Solution to Problem

A network node according to an aspect of the present invention is a network node that transfers, when one of two terminals performing communication in a first network performs handover to a second network that is different from the first network, data between the two terminals, the network node including: a detection section that detects a first codec used by the one of the two terminals in the first network and a second codec to be used by the one of the two terminals in the second network; a generating section that generates, when the first codec is a codec having a compatible mode that is compatible with the second codec, data for the other one of the two terminals by switching a codec of data transmitted from the one of the two terminals to the compatible mode of the first codec; and a transmitting section that transmits data for the other one of the two terminals to the other one of the two terminals.

A communication method according to an aspect of the present invention is a communication method for transferring, when one of two terminals performing communication in a first network performs handover to a second network that is different from the first network, data between the two terminals, the communication method including: detecting a first codec used by the one of the two terminals in the first network and a second codec to be used by the one of the two terminals in the second network; generating, when the first codec is a codec having a compatible mode that is compatible with the second codec, data for the other one of the two terminals by switching a codec of data transmitted from the one of the two terminals to the compatible mode of the first codec; and transmitting, to the other one of the two terminals, data for the other one of the two terminals.

Advantageous Effects of Invention

According to the present invention, even when one of terminals in communication changes a codec in use, it is possible to continue communication and also to reduce the disconnection time of a call without causing deterioration of call quality.

BRIEF DESCRIPTION OF DRAWINGS

FIG. 6 illustrates an example of an SDP offer and SDP answer according to Embodiment 1 of the present invention;

FIG. 10 illustrates an example of how a codec switching request is indicated in Embodiment 1 of the present invention.

DESCRIPTION OF EMBODIMENTS

Embodiments of the present invention will be described in detail with reference to the accompanying drawings.

In the following description, the term "bandwidth" refers to a bandwidth of a signal serving as input/output of a codec.

In the following description, a codec available in both a PS network and a CS network is represented by "codec A." Codec A has a dedicated payload format Codec A is, for example, AMR-WB or AMR-NB.

A codec available to the PS network is represented by "codec B." Codec B includes a non-compatible mode (codec A non-compatible mode) and a compatible mode (codec A compatible mode) with respect to codec A. However, codec B may be used in the CS network. Codec B is, for example, EVS or G718 described in NPL 7.

Embodiment 1

Figure 5:
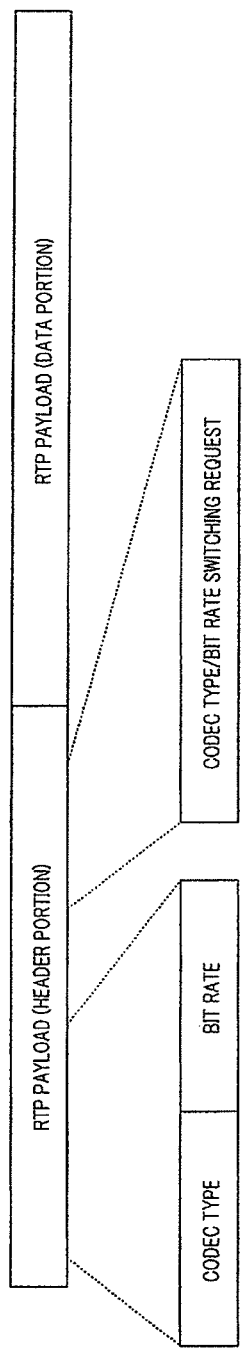
FIG. 5 illustrates an example of an RTP payload format according to Embodiment 1 of the present invention.

FIG. 5 illustrates an example of a payload format (RTP payload format) of codec B. As shown in FIG. 5, the payload format consists of a data portion and a header portion. The data portion includes data encoded by an encoder and the header portion includes information necessary for a decoder to decode data of the data portion.

The payload format of codec B in the present embodiment is configured to allow the payload receiving side to identify whether the data portion includes data in the codec A non-compatible mode or data in the codec A compatible mode. For example, as shown in FIG. 5, the header portion includes a "codec type" field and a "bit rate" field. The "codec type" includes information indicating whether the codec is in the codec A non-compatible mode or in the codec A compatible mode. The "bit rate" includes information indicating at which bit rate data is encoded among the bit rates supported in the codec A non-compatible mode or bit rates supported in the codec A compatible mode.

As shown in FIG. 5, in addition to the above-described fields, it is also possible to include a field for issuing, to a counterpart terminal on the payload receiving side, to request switching of the codec type or bit rate ("codec type/bit rate switching request" field). Note that this field need not be included for each frame, and may be included only when required.

The method has been described thus far with the payload format of codec B shown in FIG. 5 in which the header portion explicitly includes the field for implementing the configuration that allows the payload receiving side to identify whether the data portion includes data in the codec A non-compatible mode or data in the codec A compatible mode ("codec type" field, "bit rate" field) and the field for issuing, to the counterpart terminal, a request for switching of the codec type or bit rate ("codec type/bit rate switching request" field). However, the method need not always be the method shown in FIG. 5. Furthermore, an example has been described in the payload format shown in FIG. 5 where the payload format consists of the header portion and the data portion, but the header portion may be omitted in the payload format if the terminal on the receiving side that has received the payload can correctly decode data without the header portion.

The payload format of codec B is not limited to the example shown in FIG. 5, and a combination of layers (corresponding to bit rates) may be described as separate values as in the case of the payload format of G718 described in NPL 7, for example.

Next, FIG. 6 illustrates an example of a session description protocol (SDP) offer and SDP answer exchanged between terminals in session negotiation when a call starts.

Here, it is assumed that both UEs that make a call support codec B and both UEs are connected to the PS network when the call starts.

As shown in FIG. 6, the UE that supports codec B describes codec A and codec B in an SDP offer even when the UE does not support codec A. This is because when the counterpart terminal supports codec A but does not support codec B, codec A is selected in codec negotiation so as to enable the codec A compatible mode of codec B to be used using the RTP payload format of codec A. In FIG. 6, the UE which has received the SDP offer selects codec B and describes the selected codec B in the SDP answer.

The SDP offer and SDP answer may also include description of a preferential mode (codec A non-compatible mode or codec A compatible mode, bit rate, bandwidth or the like) when codec B is selected. The preferential mode may be predetermined by an operator who performs a communication service and incorporated in the UE in the form of software, or the like. In the present embodiment, when codec B is selected, it is assumed that the codec A non-compatible mode is used as a preferential mode.

Next, the mobile communication network (FIG. 1) according to the present embodiment will be described.

First, UE 100 or 102 shown in FIG. 1 will be described.

Figure 7:
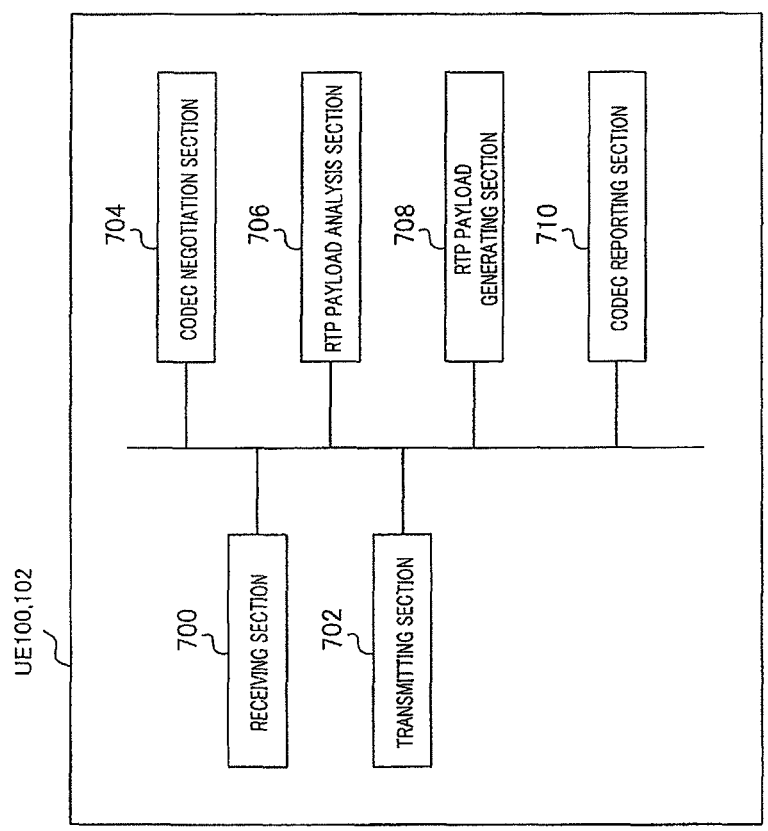
FIG. 7 is a block diagram illustrating a configuration of a terminal (UE) according to Embodiment 1 of the present invention.

FIG. 7 is a block diagram illustrating a configuration of UEs 100 and 102 (terminal) according to the present embodiment. UEs 100 and 102 are each configured of receiving section 700, transmitting section 702, codec negotiation section 704, RTP payload analysis section 706, RTP payload generating section 708 and codec reporting section 710.

In UEs 100 and 102 shown in FIG. 7, receiving section 700 receives communication data (including RTP payload) and signaling or the like. For example, when receiving an RTP payload (e.g., see FIG. 5) transmitted from MSC/MGW 110, receiving section 700 outputs the received RTP payload to RTP payload analysis section 706.

Transmitting section 702 transmits communication data (including RTP payload) and signaling or the like.

Codec negotiation section 704 negotiates a codec to be used for communication between terminals (UE 100 and UE 102). More specifically, codec negotiation section 704 creates an SDP offer or SDP answer (e.g., see FIG. 6) and performs codec negotiation. In this case, when creating an SDP offer, codec negotiation section 704 includes codec A in the SDP offer as shown in FIG. 6 even when the terminal supports codec B but does not support codec A as described above. When codec B is selected in negotiation, codec negotiation section 704 selects a preferential mode (codec A non-compatible mode or codec A compatible mode, bit rate, bandwidth or the like) according to the information described in the SDP offer and answer as described above or information incorporated beforehand in software or the like and outputs the preferential mode to RTP payload generating section 708.

RTP payload analysis section 706 analyzes the header portion of the RTP payload received from receiving section 700 and identifies information relating to data included in the data portion of the RTP payload (e.g., codec type, bit rate or the like). RTP payload analysis section 706 outputs the identified information and the data included in the data portion to a decoder (not shown). When the RTP payload received from receiving section 700 includes an instruction of "codec type/bit rate switching request," RTP payload analysis section 706 outputs the instruction to an encoder (not shown) and RIP payload generating section 708. The encoder encodes data based on the information and instruction from RTP payload analysis section 706.

RTP payload generating section 708 generates an RTP payload (e.g., see FIG. 5) including information (e.g., codec type, bit rate) relating to the data received from the encoder and the data received from codec negotiation section 704. In this case, upon receiving an instruction of a "codec type/bit rate switching request" from RTP payload analysis section 706, RTP payload generating section 708 generates an RTP payload based on the instruction. The generated RTP payload is transmitted via transmitting section 702.

When the UE of codec reporting section 710 performs handover from the PS network to the CS network, codec reporting section 710 reports, to the network node (e.g., MME) of the PS network, the codec used by the UE in the PS network. The reported codec is indicated to MSC/MGW 110 via a network node (MME) of the PS network.

Figure 8:
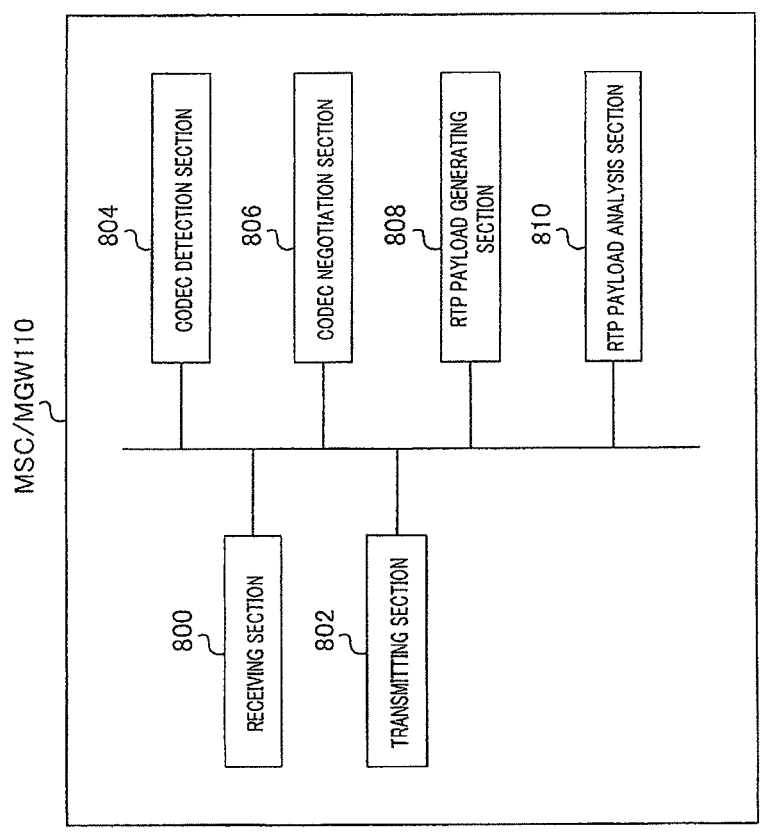
FIG. 8 is a block diagram illustrating a configuration of a network node (MSC/MGW) according to Embodiment 1 of the present invention.

Next, MSC/MGW 110 shown in FIG. 1 will be described. FIG. 8 is a block diagram illustrating a configuration of MSC/MGW 110 (network node) according to the present embodiment. MSC/MGW 110 is configured of receiving section 800, transmitting section 802, codec detection section 804, codec negotiation section 806, RTP payload generating section 808 and RTP payload analysis section 810.

In MSC/MGW 110 shown in FIG. 8, receiving section 800 receives communication data (including RTP payload) and signaling or the like. For example, upon receiving the RTP payload (e.g., see FIG. 5) transmitted from UE 102, receiving section 800 outputs the received RTP payload to RTP payload analysis section 810.

Transmitting section 802 transmits the communication data (including RTP payload) and signaling or the like.

Codec detection section 804 detects a codec to be used by a terminal that has performed handover from the PS network to the CS network (UE 100 in FIG. 1) in the CS network. Codec detection section 804 also detects a codec used by a terminal that has performed handover from the PS network to the CS network (UE 100 in FIG. 1) in the PS network. The method of detecting the codec used by the terminal (UE 100) in the PS network may be a method as disclosed in NPL 5 which is indicated from the network node (MME or the like) in the PS network when UE 100 (codec reporting section 710) performs handover to the CS network. Alternatively, the method of detecting the codec used by the terminal (UE 100) in the PS network may be a method whereby the codec is acquired from other network nodes such as SCC AS. The method of detecting the codec used by the terminal (UE 100) in the CS network may be a method using information negotiated through signaling transmitted/received between UE 100 and the network node (RNC and MSC/MGW 110) in the CS network when UE 100 performs handover to the CS network. Codec detection section 804 outputs the codec detection result to RTP payload generating section 808.

Codec negotiation section 806 negotiates the codec to be used with the UE according to an instruction from RTP payload generating section 808, for example. For example, codec negotiation section 806 negotiates (re-negotiates) the codec to be used with the terminal (UE 102 in FIG. 1) which is the communicating counterpart of the terminal (UE 100 in FIG. 1) which has performed handover from the PS network to the CS network.

RTP payload generating section 808 generates data (RTP payload) for the communicating counterpart of the terminal (UE 102 in FIG. 1) using the data received from the terminal (UE 100 in FIG. 1) based on the codec detection result received from codec detection section 804. For example, when the codec used by the terminal which has performed handover from the PS network to the CS network in the CS network is codec A and when the codec used by the terminal in the PS network is codec B, RTP payload generating section 808 switches the codec of the data (data of codec A) received from the terminal to a codec A compatible mode of codec B. That is, MSC/MGW 110 transmits the data of codec A received from the terminal as the codec A compatible mode of codec B using the RTP payload format of codec B (see FIG. 5) via transmitting section 802.

When the codec detection result received from codec detection section 804 is other than the above-described one, RTP payload generating section 808 instructs codec negotiation section 806 to negotiate (re-negotiate) a codec with the communicating counterpart (UE 102 in FIG. 1) which is the transmission destination of the received data. RTP payload generating section 808 performs transcoding, if necessary, on the communication data received from the terminal that has performed handover, based on the negotiation result and switches the mode to a codec mode based on the negotiation result. The data after codec switching (generated RTP payload) is transmitted via transmitting section 802.

RTP payload analysis section 810 analyzes the header portion of the RTP payload transmitted from the terminal (UE 102) and identifies information relating to the data (e.g., codec type, bit rate) included in the data portion of the RTP payload. RTP payload analysis section 810 outputs the specified information to codec detection section 804.

Next, the details of codec processing in MSC/MGW 110 (FIG. 8) will be described using FIG. 9. Here, a case will be described where as shown in FIG. 1, UE 100 performs handover from the PS network to the CS network while both UE 100 and UE 102 are connected to the PS network and are making a call. That is, MSC/MGW 110 is a network node which transfers data between two terminals when one UE 100 of the two terminals (UEs 100 and 102) which perform communication in the PS network performs handover to the CS network.

Figure 9:
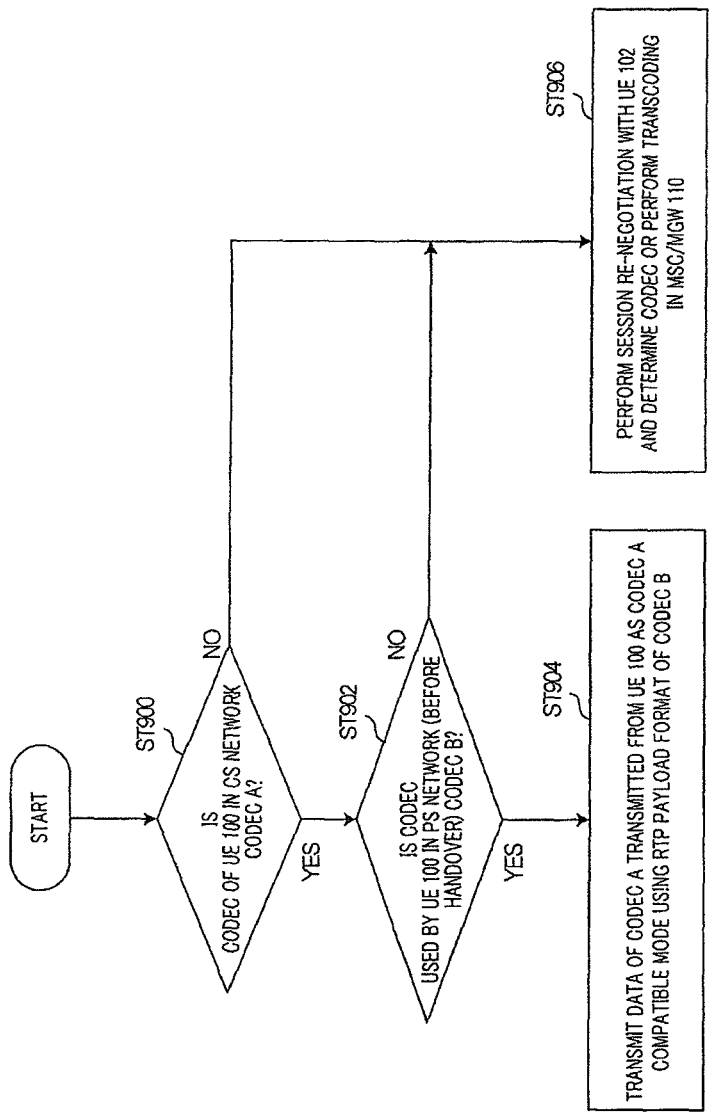
FIG. 9 is a flowchart illustrating an example of codec switching processing in MSC/MGW according to Embodiment 1 of the present invention.

In ST900 shown in FIG. 9, RIP payload generating section 808 determines whether the codec used by UE 100 in the CS network is codec A or not based on the detection result in codec detection section 804.

When the codec used by UE 100 in the CS network is codec A (ST900: YES), in ST902, RTP payload generating section 808 determines whether the codec used by UE 100 in the PS network (before handover) is codec B or not based on the detection result in codec detection section 804.

When the codec used by UE 100 in the PS network is codec B (ST902: YES), in ST904, RTP payload generating section 808 switches the codec of data (codec A) transmitted from UE 100 to a codec A compatible mode of codec B. That is, RTP payload generating section 808 transforms the data of codec A transmitted from UE 100 into a codec A compatible mode of codec B using the RTP payload format of codec B and transmits the data to UE 102 via transmitting section 802.

This allows UE 102 using codec B to handle the data transmitted from MSC/MGW 110 to UE 102 as the data of codec B (codec A compatible mode of codec B).

On the other hand, when the codec used by UE 100 in the CS network is not codec A (ST900: NO) or when the codec used by UE 100 in the PS network is not codec B (ST902: NO), in ST906, codec negotiation section 806 performs session re-negotiation with UE 102 and determines the codec. RTP payload generating section 808 then generates an RTP payload of the determined codec.

Alternatively, in ST906, MSC/MGW 110 may perform transcoding on the data transmitted from UE 100 and transmit the transcoded data (data for UE 102) to UE 102.

Thus, when a change of the codec of one UE is detected, MSC/MGW 110 determines whether or not the codec of data for the other UE can be switched based on the codec after the change of the UE and the codec before the change of the UE.

Next, an example of operation of UE 100 or 102 (FIG. 7) and MSC/MGW 110 (FIG. 8) in the present embodiment will be described.

In the following description, in FIG. 1 and FIG. 2, both UE 100 and UE 102 are connected to the PS network and start a call. Here, let us suppose that a call is made from UE 100 to UE 102.

When a call starts, a codec to be used between UE 100 and UE 102 is negotiated. For example, UE 100 (codec negotiation section 704) generates an SDP offer (e.g., see FIG. 6) and transmits the SDP offer to UE 102. In contrast, UE 102 (codec negotiation section 704) generates an SDP answer (e.g., see FIG. 6, codec B is selected in FIG. 6), and transmits the SDP answer to UE 100. Upon completion of operation of an example associated with this start of call, UE 100 or 102 makes a call using a codec A non-compatible mode of codec B (preferential mode when codec B is selected) (FIG. 2: Speech Session over PS).

Figure 1:
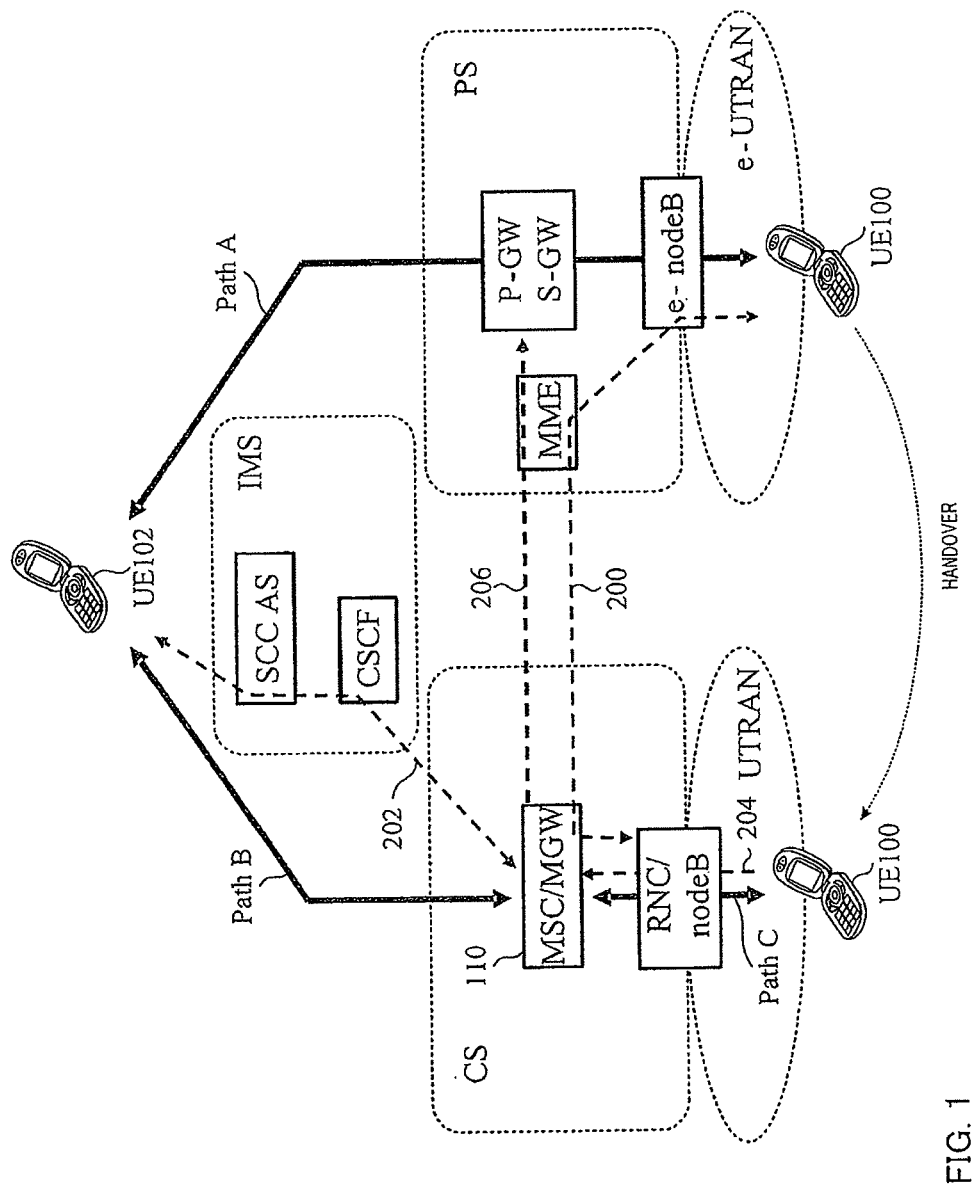
FIG. 1 is a configuration diagram illustrating part of a 3GPP mobile communication network.
Figure 2:
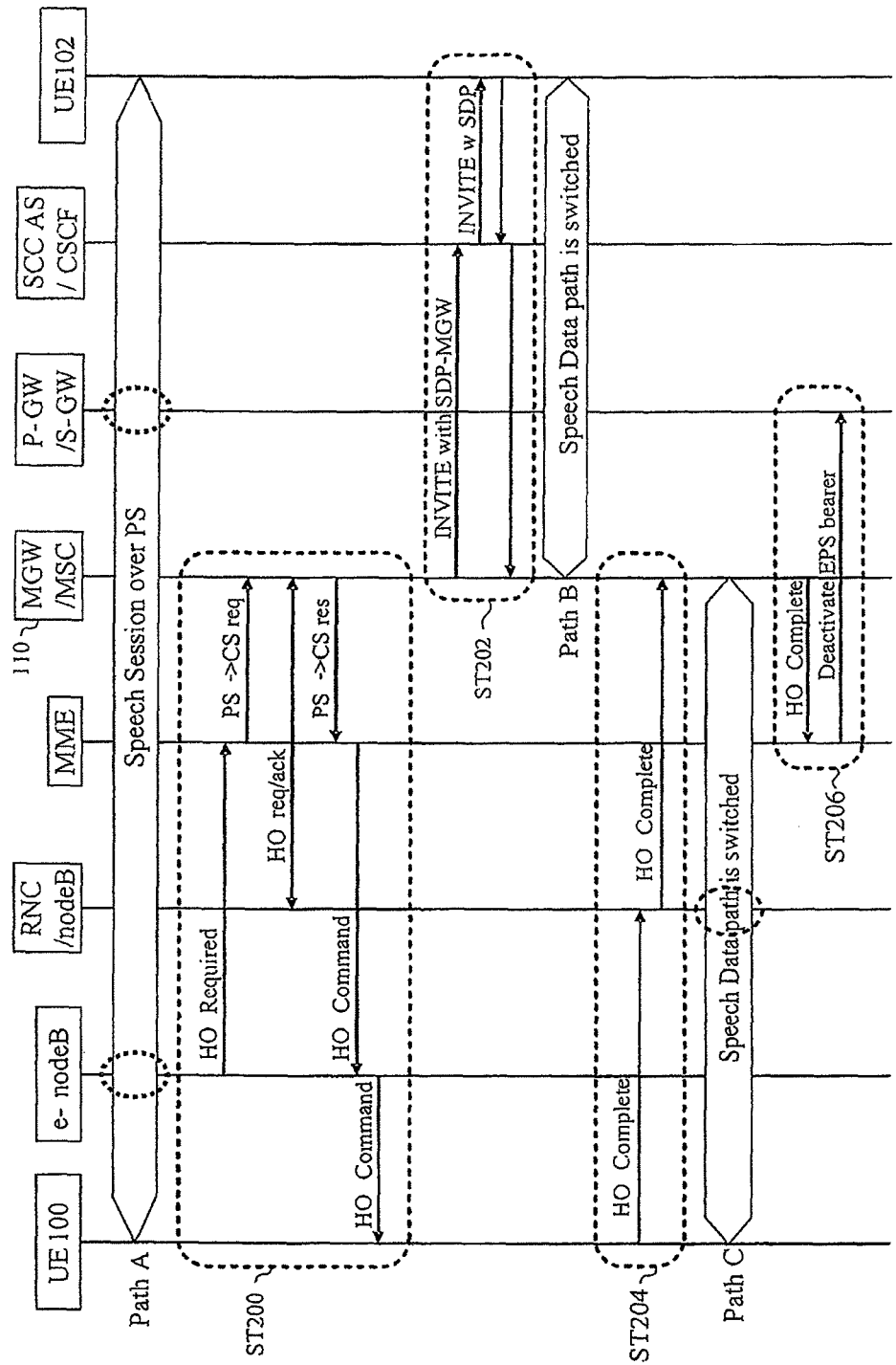
FIG. 2 is a sequence chart illustrating an SRVCC handover operation.

Next, as shown in FIG. 1, UE 100 performs handover from the PS network to the CS network (ST200 and ST204 shown in FIG. 2). Here, let us suppose that the codec used by UE 100 in the CS network is codec A.

Simultaneously with the handover processing of UE 100, MSC/MGW 110 (codec detection section 804) detects the codec to be used by UE 100 when performing handover to the CS network. MSC/MGW 110 (codec detection section 804) also detects the codec used by UE 100 in the PS network. As described above, MSC/MGW 110 detects that the codec used by UE 100 in CS network is codec A and the codec used by UE 100 in PS network is codec B (that is, ST900 shown in FIG. 9: YES and ST902: YES).

In this case, MSC/MGW 110 (RTP payload generating section 808) switches the codec of the data transmitted from UE 100 (codec A) to a codec A compatible mode of codec B and thereby generates an RTP payload for UE 102. That is, MSC/MGW 110 transmits the data of codec A transmitted from UE 100 as a codec A compatible mode of codec B to UE 102 using the RTP payload format of codec B.

In this case, when RTP payload generating section 808 switches the codec of the data transmitted from UE 100, MSC/MGW 110 may transmit a request for switching from a codec A non-compatible mode to a codec A compatible mode to UE 102 which is the communicating counterpart of UE 100. For example, in the RTP payload format of codec B (e.g., see FIG. 5), MSC/MGW 110 (RTP payload generating section 808) may include an instruction for switching from the codec A non-compatible mode to the codec A compatible mode in the header portion ("codec type/bit rate switching request" field).

On the other hand, UE 102 (RTP payload analysis section 706) determines that the data included in the data portion of the RTP payload is codec A (codec that can be handled as a codec A compatible mode) from the information included in the data received from MSC/MGW 110 (information of the header portion of the RTP payload) and hands over the information and data to the decoder. This causes the decoder of UE 102 to recognize that the codec of the received data is codec A (codec A compatible mode of codec B) and decode the data.

When the received RTP payload includes a request for switching from the codec A non-compatible mode to codec A compatible mode, UE 102 (e.g., RTP payload analysis section 706) outputs the request for switching to an encoder (not shown) and RTP payload generating section 708. This causes UE 102 to determine to use the codec A compatible mode of codec B also for data transmitted from UE 102. That is, UE 102 (RTP payload generating section 708) stores the data of the codec A compatible mode received from the encoder in the payload format of codec B and transmits the data to MSC/MGW 110.

Thus, according to the present embodiment, in MSC/MGW 110, codec detection section 804 detects the codec used by UE 100 in the PS network and the codec to be used by UE 100 in the CS network, and when the codec used by UE 100 in the PS network is a codec having a compatible mode with the codec used by UE 100 in the CS network, RTP payload generating section 808 generates data for UE 102 by switching the codec of data transmitted from UE 100 to a compatible mode of the codec used by UE 100 in the PS network. That is, when the codec used by UE 100 in the PS network is a codec having a compatible mode with the codec used by UE 100 in the CS network, MSC/MGW 110 transmits the data of codec A transmitted from UE 100 in the codec A compatible mode using the RTP payload format of codec B. This allows UE 102 that uses codec B to receive data from UE 100 without changing the codec of UE 102.

That is, MSC/MGW 110 switches the data of the codec after handover from UE 100 to part of a codec before handover (one of codec modes before handover), eliminates the necessity for signaling to change the codec between UE 100 and UE 102, and can thereby prevent the disconnection time of a call from being prolonged. MSC/MGW 110 switches only the codec mode without changing the codec data between UE 100 and UE 102, and can thereby prevent deterioration of call quality unlike transcoding. Thus, according to the present embodiment, even when the codec used by one of the terminals in communication is changed, it is possible to continue communication and also to reduce the disconnection time of a call without causing deterioration of call quality.

According to the present embodiment, when a codec of data transmitted from one terminal (UE 100) is switched, MSC/MGW 110 transmits, to the other terminal (UE 102), a request for switching to a compatible mode for data transmitted by the other terminal (UE 102). UE 102 then transmits data in the codec A compatible mode according to the request for switching to the codec A compatible mode from MSC/MGW 110. This allows MSC/MGW 110 and UE 100 to handle the data transmitted from UE 102 (codec A compatible mode of codec B) as data of codec A.

Note that the indication of the request for switching from the codec A non-compatible mode to the codec A compatible mode to UE 102 need not always be included in the RTP payload from MSC/MGW 110 to UBE 102. For example, the request for switching may be indicated to UE 102 as an SDP offer shown in FIG. 10 in the SDP of INVITE with SDP-MGW transmitted from MSC/MGW 110 in ST202 shown in FIG. 2. Moreover, the above-described request for switching may be indicated from MSC/MGW 110 to UE 102 using RTCP-APP disclosed in NPL 6.

When UE 102 receives data of codec A in the RTP payload format of codec B, UE 102 may determine that the data from UE 102 (transmission data) should also be encoded in the codec A compatible mode after receiving the data. In this case, the above-described request for switching becomes unnecessary.

Embodiment 2

The present embodiment will be described using FIG. 3 and FIG. 4. In the following description, like Embodiment 1, let us suppose that UE 100 and UE 102 make a call using codec B in the PS network first, and only UE 100 performs handover from the PS network to the CS network. In addition, the codec used by UE 100 in the CS network is codec A.

Figure 3:
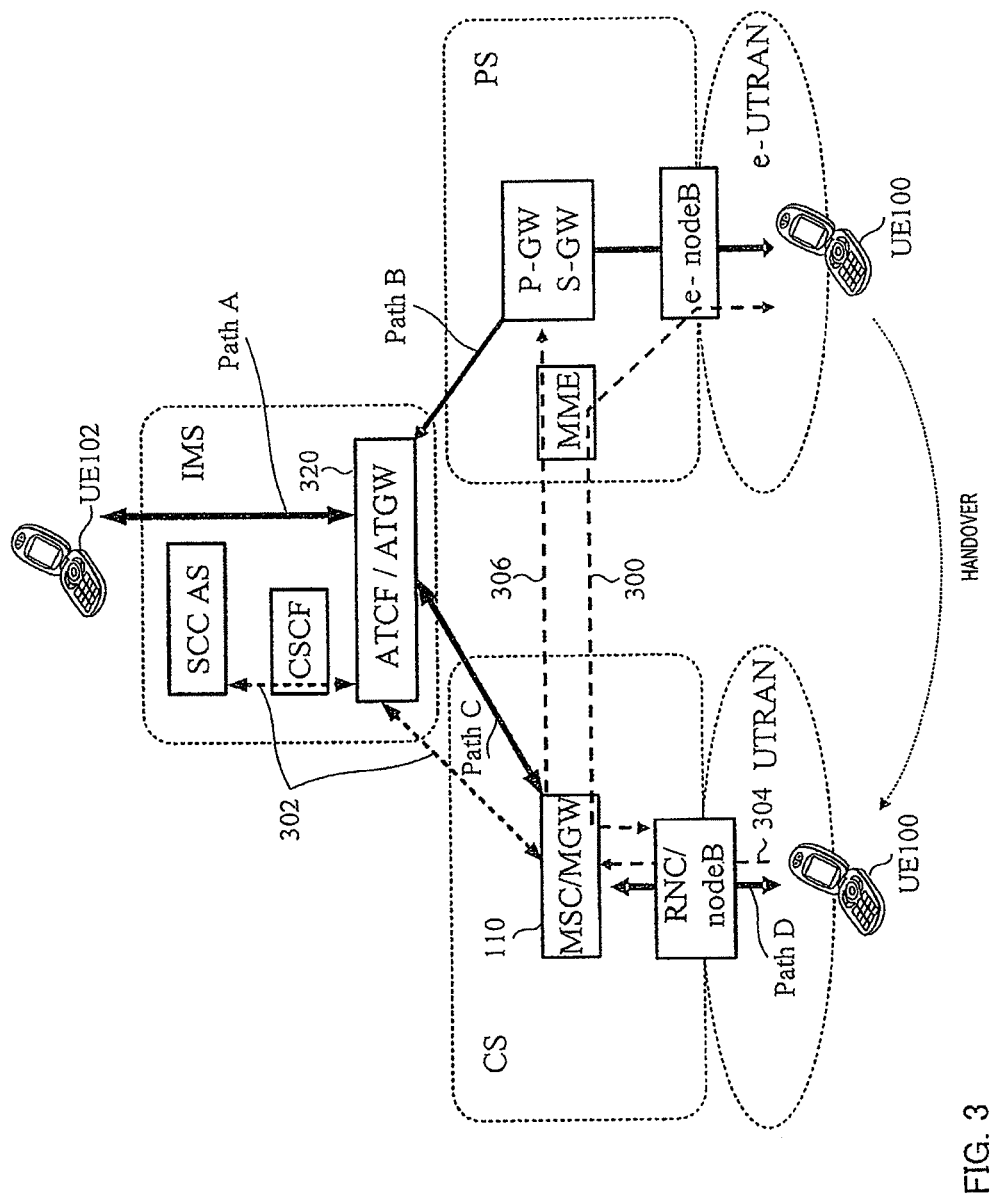
FIG. 3 is a configuration diagram illustrating part of a 3GPP mobile communication network that enables eSRVCC.
Figure 4:
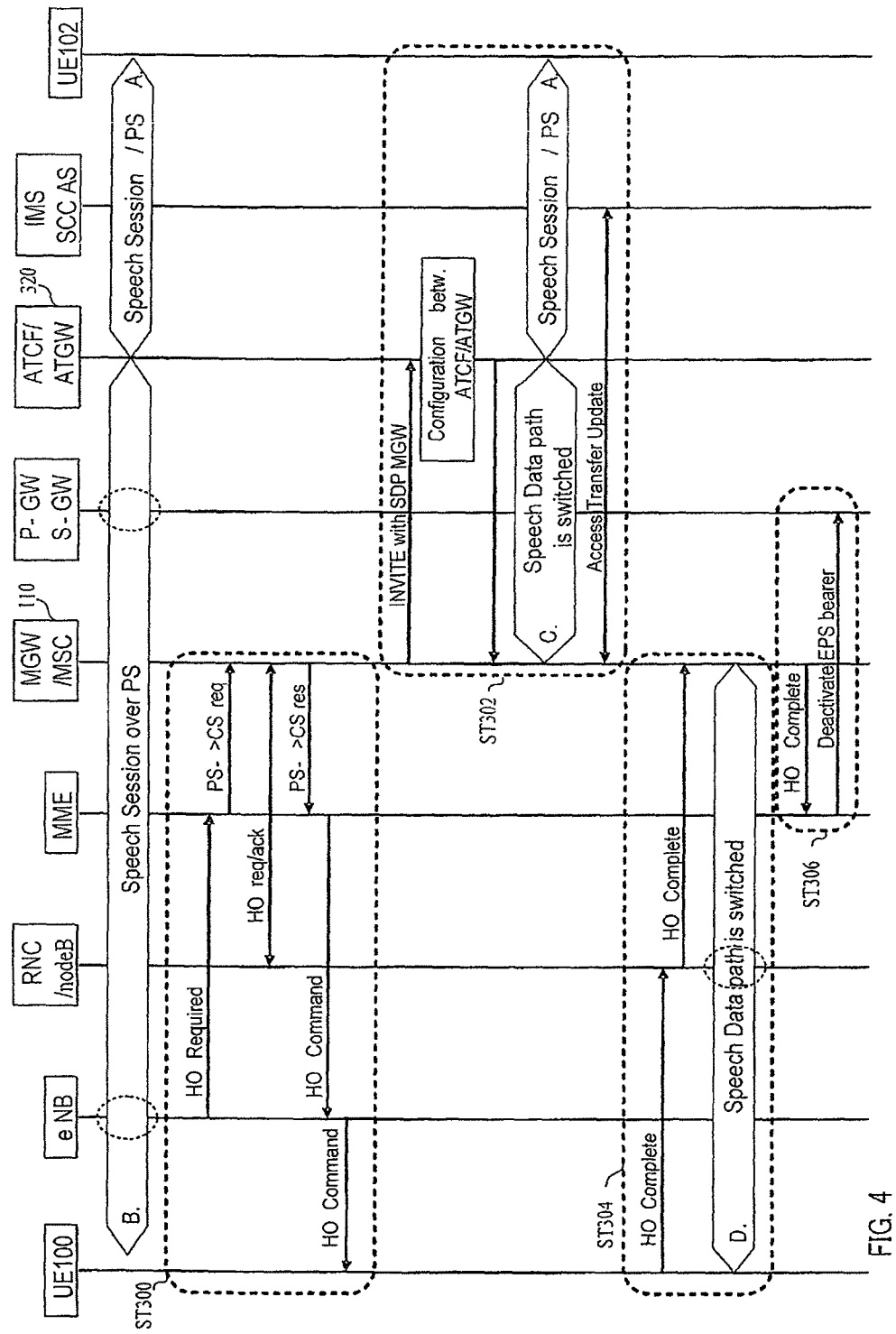
FIG. 4 is a sequence chart illustrating an eSRVCC handover operation.

ATCF/ATGW 320 shown in FIG. 3 and FIG. 4 is simply a data anchor point. Therefore, when ATCF/ATGW 320 shown in FIG. 3 and FIG. 4 is forwarding data from UE 100 to UE 102 or data from UE 102 to UE 100, the functions of MSC/MGW 110 (FIG. 8) and UE 100, UE 102 (FIG. 7) are identical to those of Embodiment 1 (FIG. 5 to FIG. 9). However, MSC/MGW 110 is different from that in Embodiment 1 only in that INVITE with SDP in ST202 shown in FIG. 2 cannot be used when a codec switching request (request for switching from a codec A non-compatible mode to a codec A compatible mode) is indicated to UE 102.

Let us suppose that ATCF/ATGW 320 has information on a codec used by UE 100 in Path B shown in FIG. 3 and a codec used by UE 102 in Path A shown in FIG. 3 or is provided with means capable of obtaining the information from another node.

In this case, even when codec detection section 804 of MSC/MGW 110 has no information on the codec used by UE 100 in the PS network (Path B shown in FIG. 3), ATCF/ATGW 320 can indicate, to MSC/MGW 110, the information on the codec used by UE 100 in the PS network as a reply message of INVITE with SDP-MGW in ST302 shown in FIG. 4.

Thus, MSC/MGW 110 (RTP payload generating section 808) can immediately identify a codec used by UE 100 (terminal that has performed handover) in the PS network. That is, MSC/MGW 110 can set the data transmitted from UE 100, based on the codec used by UE 100 (terminal that has performed handover) in the PS network in a codec A compatible mode using the RTP payload format of codec B, and immediately transmit the data to UE 102. Similarly, MSC/MGW 110 can immediately transmit, to UE 102, a request for switching to UE 102.

According to the present embodiment, even in the case of an eSRVCC scheme or a case where the codec used by one of the terminals in communication is changed like Embodiment 1, it is possible to continue communication while reducing the disconnection time of a call without causing deterioration of call quality.

Embodiment 3

In this embodiment, a description will be given of a case where a terminal that has performed handover from the PS network to the CS network (UE 100 in FIG. 1) returns to the PS network again.

Figure 11:
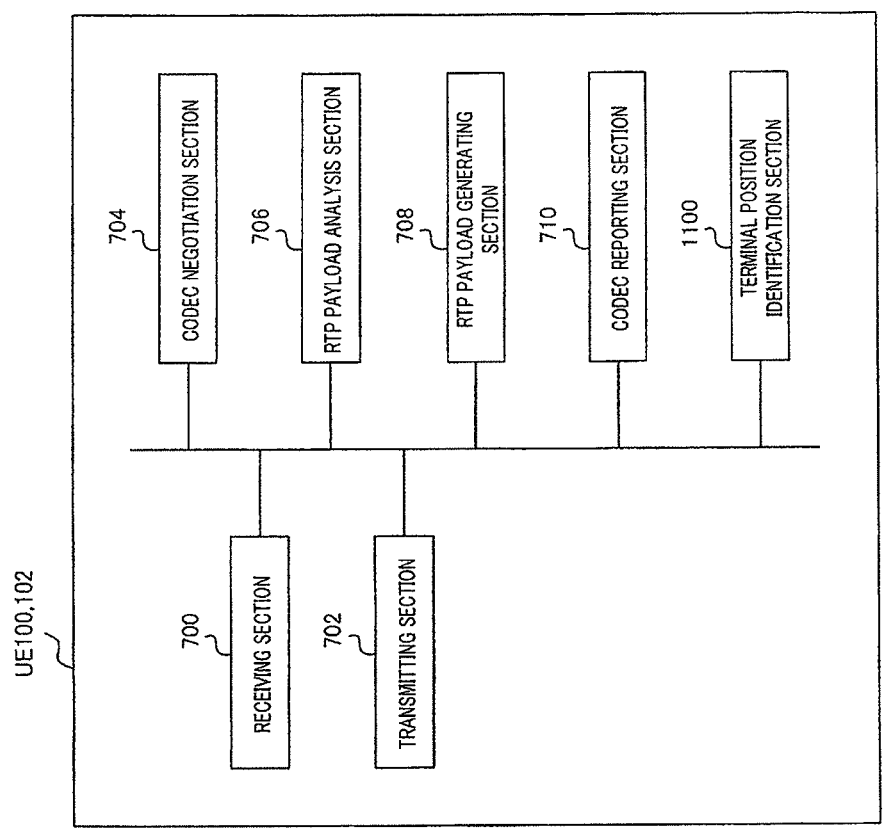
FIG. 11 is a block diagram illustrating a configuration of a terminal (UE) according to Embodiment 3 of the present invention.

FIG. 11 is a block diagram illustrating a configuration of UEs 100 and 102 (terminal) according to the present embodiment. In FIG. 11, components identical to those of Embodiment 1 (FIG. 7) will be assigned the same reference numerals and description thereof will be omitted.

In UE 100 (102) shown in FIG. 11, terminal position identification section 1100 identifies a network (PS network or CS network) to which UE 100 (102) of terminal position identification section 1100 is connected, that is, terminal position identification section 1100 identifies the position of UE 100 (102). This allows UE 100 (102) to perform handover. Terminal position identification section 1100 may determine the position of UE 100 (102) of terminal position identification section 1100 from base station ID of the destination (e.g., e-nodeB or nodeB) or determine the position of UE 100 or 102 from establishment of connection in the PS core network.

For example, let us suppose that UE 100 which has performed handover from the PS network to the CS network returns to the PS network again. Moreover, it is assumed that UE 100 uses codec A in the CS network. At this time, terminal position identification section 1100 identifies that UE 100 has been connected to the PS network.

UE 100 which has identified through terminal position identification section 1100 that UE 100 has been connected to the PS network switches the codec of UE 100 from codec A to codec B (codec A non-compatible mode). RTP payload generating section 708 of UE 100 generates an RTP payload using the payload format of codec B. This RTP payload is transmitted to UE 102 via transmitting section 702.

On the other hand, RTP payload analysis section 706 of UE 102 detects that the codec of the data received from UE 100 has been switched from a codec A compatible mode to a codec A non-compatible mode. RTP payload analysis section 706 then hands over information indicating that the codec of UE 100 has been switched and data to a decoder. Thus, the decoder of UE 102 decodes the data received from UE 100 in the codec A non-compatible mode of codec B.

When the RTP payload received includes a request for switching from the codec A compatible mode to the codec A non-compatible mode, RTP payload analysis section 706 of UE 102 hands over this request for switching to the encoder and RTP payload generating section 708. Accordingly, UE 102 determines to use the codec A non-compatible mode of codec B also on the data transmitted from UE 102. That is, RTP payload generating section 708 of UE 102 stores the data in the codec A non-compatible mode handed over by the encoder in the payload format of codec B and transmits the data to UE 100.

The indication of the request for switching from the codec A compatible mode to the codec A non-compatible mode to UE 102 need not always be included in the RTP payload from UE 100 to UE 102. For example, the request for switching may be included in an IMS message described in NPL 8. The request for switching may be indicated from MSC/MGW 110 to UE 102 using RTCP-APP described in NPL 6.

Upon reception of data in the codec A non-compatible mode in the RTP payload format of codec B, UE 102 may determine that the data from UE 102 (transmission data) should also be encoded in the codec A non-compatible mode after receiving the data. In this case, the above-described request for switching becomes unnecessary.

In this way, even when the terminal which has performed handover from the PS network to the CS network returns to the PS network again, the terminal changes the codec based on the current position of the terminal, and can thereby continue communication while reducing the disconnection time of a call without causing deterioration of call quality.

Hereinbefore, embodiments of the invention have been described.

In the above-described embodiments, ATCF/ATGW 320, MSC/MGW 110, and SCC AS/CSCF each have been described as a single node. However, ATCF/ATGW 320, MSC/MGW 110, and SCC AS/CSCF may be each configured of two or more different nodes which are connected to each other via an interface. That is, the above-described function may be distributed over a plurality of nodes between ATCF and ATGW, between MSC and MGW, and between SCC AS and CSCF.

Furthermore, in the above-described respective embodiments, the description has mainly been made using the codec relating to voice. However, the invention is not limited thereto, and may be applied to music, sound, images or the like.

In addition, the present invention is by no means limited to the embodiments described above, and various modifications are possible.

Although the foregoing embodiments have been described for the example of hardware implementation of the present invention, the present invention can be implemented with software, in concert with hardware.

Each of the functional blocks used in the descriptions of the embodiments are realized typically by LSI (large-scale integration), which is an integrated circuit. The functional blocks may each be a separate single chip, or some or all of the functional blocks may be collectively made into a single chip. The term "LSI" is used herein but the integrated circuit may be called an IC (integrated circuit), a system LSI device, a super-LSI device, or an ultra-LSI device depending on a difference in the degree of integration.

In addition, the integrated circuit is not limited to LSI and may be implemented by a dedicated circuit or by a general-purpose processor. In addition, an FPGA (field programmable gate array), which is programmable, or a reconfigurable processor that allows reconfiguration of connections or settings of the circuit cells in LSI may be used after the production of LSI.

Additionally, in the event of emergence of technology for circuit integration that replaces LSI technology by advancements in semiconductor technology or technology derivative therefrom, such technology may be used to integrate the functional blocks. Biotechnology may be applied, for example.

The disclosure of Japanese Patent Application No. 2011-261617, filed on Nov. 30, 2011, including the specification, drawings, and abstract, is incorporated herein by reference in its entirety.

INDUSTRIAL APPLICABILITY

The present invention is useful in continuing communication while reducing the disconnection time of a call without causing deterioration of call quality even when a codec used in one of communication terminals in communication is changed.

REFERENCE SIGNS LIST 100, 102 UE
200, 202, 204, 206, 300, 302, 304, 306 Signaling
110 MSC/MGW
320 ATCF/ATGW
700, 800 Receiving section 702, 802 Transmitting section
704, 806 Codec negotiation section
706, 810 RTP payload analysis section
708, 808 RTP payload generating section
710 Codec reporting section
804 Codec detection section
1100 Terminal position identification section

What is claimed is:

1. A network node that communicates with a first terminal, which supports a first codec and a second terminal, comprising:
   a detector that detects switching of a codec of the first terminal and the second terminal,
   wherein the first codec supports a codec A compatible mode and a codec A non-compatible mode, the first codec being a new codec and codec A having a dedicated payload format,
   wherein the codec A compatible mode is compatible with a second codec and the codec A non-compatible mode is non-compatible with the second codec, the second codec being a legacy codec, and
   wherein the codec A non-compatible mode in a session negotiation being selected the codec A non-compatible mode to be used for the communication between the first terminal and the second terminal when the communication starts; and
   a transmitter that transmits a signal for the second terminal to switch the negotiated codec A non-compatible mode of the second terminal to the codec A compatible mode, when the detector detects that the negotiated codec A non-compatible mode of the first terminal is switched to the codec A compatible mode or the second codec in the communication between the first terminal and the second terminal.

2. The network node according to claim 1,
   wherein when the detector detects that the negotiated codec A non-compatible mode of the first terminal is switched to a third codec, the third codec being not any of the codec A compatible mode and the second codec in the communication after the codec A non-compatible mode is selected by the session negotiation, the transmitter transmits re-negotiate a codec to be used for the communication to the first terminal and the second terminal.

3. The network node according to claim 1,
   wherein the payload format is common for the codec A compatible mode and the codec A non-compatible mode.

4. The network node according to claim 1,
   wherein the signal is transmitted by a Real-time Transport Protocol (RTP) Payload header of the first codec.

5. The network node according to claim 1,
   wherein the signal is included in a Session Description Protocol (SDP) offer.

6. The network node according to claim 1,
   wherein the signal is transmitted by a Real-time Transport Control Protocol (RTCP).

7. A method of communicating between a network node and a first terminal, which supports a first codec and a second terminal, comprising:
   detecting, by a detector, switching of a codec of the first terminal and the second terminal;
   wherein the first codec supports a codec A compatible mode and a codec A non-compatible mode, the first codec being a new codec and codec A having a dedicated payload format,
   wherein the codec A compatible mode is compatible with a second codec and the codec A non-compatible mode is non-compatible with the second codec, the second codec being a legacy codec, and
   wherein the codec A non-compatible mode in a session negotiation being selected the codec A non-compatible mode to be used for the communication between the first terminal and the second terminal when the communication starts; and
   transmitting, by a transmitter, a signal for the second terminal to switch the negotiated codec A non-compatible mode of the second terminal to the codec A compatible mode, when the detector detects that the negotiated codec A non-compatible mode of the first terminal is switched to the codec A compatible mode or the second codec in the communication between the first terminal and the second terminal.

8. The method according to claim 7,
   wherein when the detector detects that the negotiated codec A non-compatible mode of the first terminal is switched to a third codec, the third codec being not any of the codec A compatible mode and the second codec in the communication after the codec A non-compatible mode is selected by the session negotiation, the transmitter transmits re-negotiate a codec to be used for the communication to the first terminal and the second terminal.

9. The method according to claim 7,
   wherein the payload format is common for the codec A compatible mode and the codec A non-compatible mode.

10. The method according to claim 7,
    wherein the signal is transmitted by a Real-time Transport Protocol (RTP) Payload header of the first codec.

11. The method according to claim 7,
    wherein the signal is included in a Session Description Protocol (SDP) offer.

12. The method according to claim 7,
    wherein the signal is transmitted by a Real-time Transport Control Protocol (RTCP).

* * * * *